(12) United States Patent
Deng et al.

(10) Patent No.: US 12,415,396 B1
(45) Date of Patent: Sep. 16, 2025

(54) LIFTABLE REAR SUSPENSION SYSTEM OF AMPHIBIOUS VEHICLE

(71) Applicants: Zhuhai College of Science and Technology, Zhuhai (CN); ShenZhen HISIBI Marine Technology Company Limited, Shenzhen (CN)

(72) Inventors: Baoqing Deng, Zhuhai (CN); Zengfa Gao, Zhuhai (CN); Yuxiang Shi, Zhuhai (CN); Yongzhen Wang, Zhuhai (CN); Yongbin Qin, Zhuhai (CN); Linjun Liu, Zhuhai (CN); Mulin Luo, Zhuhai (CN)

(73) Assignees: Zhuhai College of Science and Technology, Zhuhai (CN); ShenZhen HISIBI Marine Technology Company Limited, Shenzhen (CN)

( * ) Notice: Subject to any disclaimer, the term of this patent is extended or adjusted under 35 U.S.C. 154(b) by 0 days.

(21) Appl. No.: 19/024,244

(22) Filed: Jan. 16, 2025

(30) Foreign Application Priority Data

Sep. 14, 2024 (CN) .......................... 202411296243.4

(51) Int. Cl.
*B60G 17/015* (2006.01)
*B60F 3/00* (2006.01)
(Continued)

(52) U.S. Cl.
CPC .......... *B60G 17/0157* (2013.01); *B60F 3/003* (2013.01); *B60G 7/001* (2013.01);
(Continued)

(58) Field of Classification Search
CPC ...... B60S 9/04; B60S 9/12; B60S 9/18; B60S 9/20; B60G 17/0157; B60G 7/001;
(Continued)

(56) References Cited

U.S. PATENT DOCUMENTS

| 4,958,584 A | * | 9/1990 | Williamson | ............ B60F 3/003 440/12.52 |
| 5,716,042 A | * | 2/1998 | Derviller | ................... F16F 3/02 280/124.137 |

(Continued)

FOREIGN PATENT DOCUMENTS

DE 102016206220 A1 * 10/2017 ............. B60G 15/02

OTHER PUBLICATIONS

Translation of DE-102016206220-A1.*
ZD Conical Motor; Feb. 2018.*

*Primary Examiner* — Paul N Dickson
*Assistant Examiner* — Shams Dhanani
(74) *Attorney, Agent, or Firm* — THOMAS | HORSTEMEYER, LLP

(57) ABSTRACT

A liftable rear suspension system of an amphibious vehicle is provided, including a differential gear installed inside a vehicle body frame, and a brake disc installed on the inner side of a hub of a vehicle wheel, with a brake arranged on an outer edge of the brake disc and a flange plate fixed on the inner side of the brake disc. A universal joint arm is rotatably installed on the periphery of one end, close to the vehicle body frame, of the flange plate through a bearing. The flange plate is connected to an output shaft of the differential gear through a cage universal joint. A worm gear is rotatably installed on the periphery of one end, stretching out of the vehicle body frame, of the output shaft through a bearing. A pair of bearing seats are installed on the vehicle body frame through an installation rack.

7 Claims, 3 Drawing Sheets

(51) Int. Cl.
  *B60G 7/00* (2006.01)
  *B60G 13/06* (2006.01)
  *B60T 1/06* (2006.01)
(52) U.S. Cl.
  CPC .............. *B60G 13/06* (2013.01); *B60T 1/065* (2013.01); *B60G 2200/144* (2013.01); *B60G 2200/156* (2013.01); *B60G 2300/28* (2013.01); *B60G 2500/324* (2013.01)
(58) Field of Classification Search
  CPC .............. B60G 13/06; B60G 2200/144; B60G 2200/156; B60G 2300/28; B60G 2500/324; B60F 3/003; B60T 1/065
  See application file for complete search history.

(56) References Cited

U.S. PATENT DOCUMENTS

| | | | |
|---|---|---|---|
| 9,895,949 B2 * | 2/2018 | Lu | B60F 3/003 |
| 11,712,964 B1 * | 8/2023 | Drach | B60K 7/0015 |
| | | | 180/245 |
| 2004/0072479 A1 * | 4/2004 | Roycroft | B60G 3/20 |
| | | | 440/12.5 |
| 2006/0183384 A1 * | 8/2006 | Longdill | B60G 3/20 |
| | | | 440/12.5 |
| 2014/0224561 A1 * | 8/2014 | Shinbori | B60G 7/001 |
| | | | 180/253 |
| 2017/0080977 A1 * | 3/2017 | Schroeder | B62D 65/12 |

* cited by examiner

LIFTABLE REAR SUSPENSION SYSTEM OF AMPHIBIOUS VEHICLE

CROSS-REFERENCE TO RELATED APPLICATION

This patent application claims the benefit and priority of Chinese Patent Application No. 202411296243.4 filed with the China National Intellectual Property Administration on Sep. 14, 2024, the disclosure of which is incorporated by reference herein in its entirety as part of the present application.

TECHNICAL FIELD

The present disclosure relates to the technical field of suspension systems, in particular to a liftable rear suspension system of an amphibious vehicle.

BACKGROUND

As a novel vehicle that integrates the functions of a land vehicle and an underwater boat, the amphibious vehicle can exert unique performances on land, water and water-land border areas. The suspension system is a key component of the amphibious vehicle, and plays a vital role in vehicle driving performance, control stability and passengers comfort.

When the existing vehicle suspension system travels on land or under water, the suspension system has certain limitations in passing performance, cannot meet the vehicle passing requirement in complex terrains, and cannot provide sufficient ground clearance and twisting ability to cope with various terrain challenges. Therefore, there is room for improvement.

Therefore, a liftable rear suspension system of an amphibious vehicle is provided to solve the above-mentioned problems.

SUMMARY

The present disclosure intends to provide a liftable rear suspension system of an amphibious vehicle so as to solve the problems mentioned in the background.

In order to achieve the above intentions, the present disclosure provides the following technical solutions.

A liftable rear suspension system of an amphibious vehicle includes a differential gear and a brake disc. The differential gear is installed inside a vehicle body frame. The brake disc is installed on an inner side of a hub of a vehicle wheel. A brake is arranged on an outer edge of the brake disc, and a flange plate is fixed on an inner side of the brake disc. A universal joint arm is rotatably installed on a periphery of one end, close to the vehicle body frame, of the flange plate through a bearing. The flange plate is connected to an output shaft of the differential gear through a cage universal joint. A worm gear is rotatably installed on a periphery of one end, stretching out of the vehicle body frame, of the output shaft through a bearing. A pair of bearing seats are installed on the vehicle body frame through an installation rack. A worm is rotatably connected between the pair of bearing seats, and the worm is in meshed connection with the worm gear. A motor for driving the worm to rotate is installed outside the bearing seat. A first double wishbone and a second double wishbone are respectively hinged between the universal joint arm and the worm gear. A shock absorber is hinged between a surface of the first double wishbone and the worm gear.

In some embodiments, a connection point of the cage universal joint with the flange plate coincides with a central point at one end, close to the cage universal joint, of the flange plate.

In some embodiments, an included angle between two axes of the cage universal joint is 46°.

In some embodiments, the first double wishbone and the second double wishbone are each 360 mm in arm length and 15 mm in thickness.

In some embodiments, the first double wishbone and the second double wishbone are located on two sides of the cage universal joint respectively.

In some embodiments, the shock absorber is a bidirectional cylindrical shock absorber.

In some embodiments, a model number of the motor is ZD31-4.

Compared with the prior art, the present disclosure has the following beneficial effects.

According to the liftable rear suspension system of an amphibious vehicle, power is provided for driving the worm to rotate by starting the motor, and the rotation of the worm gear is realized with the transmission principle of the gear. When the worm gear rotates, the universal joint arm is driven to rotate through two double wishbones, so that the adjustment of the vertical height between the output shaft and the flange plate is realized. Thus, the lifting of the vehicle chassis is promoted to provide sufficient ground clearance and meet the passing requirement of the vehicle in complex terrains, and then the passing performance of the vehicle is effectively improved.

Reference signs in drawings: 1, vehicle body frame; 2 differential gear; 3, vehicle wheel; 4, brake disc; 5, brake; 6, flange plate; 7, universal joint arm; 8, output shaft; 9, cage universal joint; 10, worm gear; 11, installation rack; 12, bearing seat; 13, worm; 14, motor; 15, first double wishbone; 16, second double wishbone; and 17, shock absorber.

DETAILED DESCRIPTION OF THE EMBODIMENTS

In the description of the present disclosure, it needs to be understood that the indicative direction or position relations of the terms such as "central", "longitudinal", "transverse", "upper", "lower", "front", "rear", "left", "right", "vertical", "horizontal", "top", "bottom", "inside" and "outside" are direction or position relations illustrated based on the accompanying drawings, just for facilitating the description of the present disclosure and simplifying the description, but not for indicating or hinting that the indicated device or element must be in a specific direction and be constructed and operated in the specific direction, and therefore the above terms cannot be understood as the restriction of the present disclosure. In the descriptions of the embodiments of the present invention, "plurality of" means two or more than two, unless otherwise specified.

In the description of the present disclosure, it needs to be illustrated that, unless otherwise specified and limited, the terms such as "installation", "link" and "connection" should be generally understood, for example, the "connection" can be fixedly connected, detachably connected or integrally connected; and also can be mechanically connected, electrically connected; and can be directly connected, and also can be indirectly connected through an intermediate media, and also can be communicated internally between two elements. For those skilled in the art, the specific meanings of the terms in the present disclosure can be understood according to specific conditions.

The following clearly and completely describes the technical solutions in the embodiments of the present disclosure in combination with the accompanying drawings in the embodiments of the present disclosure. Apparently, the described embodiments are merely a part rather than all of the embodiments of the present disclosure. Based on the embodiments in the present disclosure, all other embodiments acquired by those skilled in the art under the premise of without contributing creative labor fall within the protection scope of the present disclosure.

Figure 1:
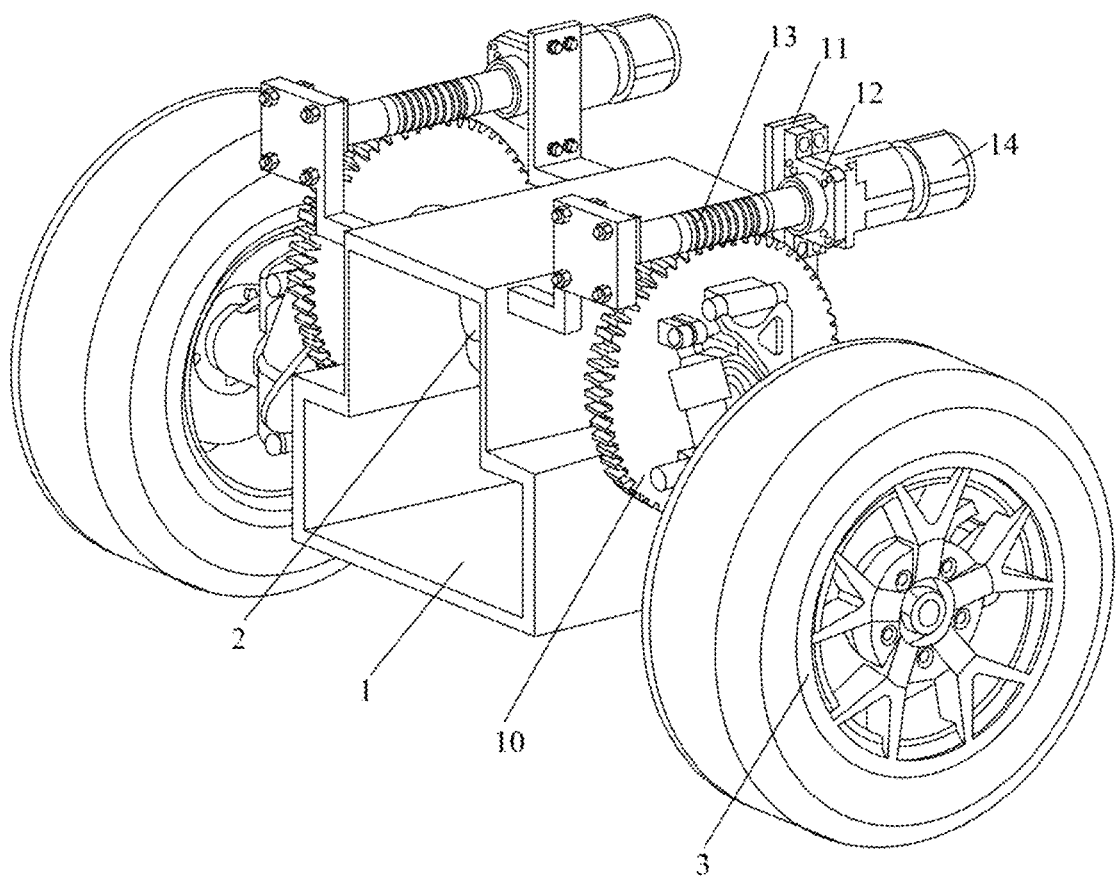
FIG. 1 is a structural schematic diagram of a suspension system installed between a vehicle body frame and vehicle wheels on both sides according to an embodiment of the present disclosure.
Figure 2:
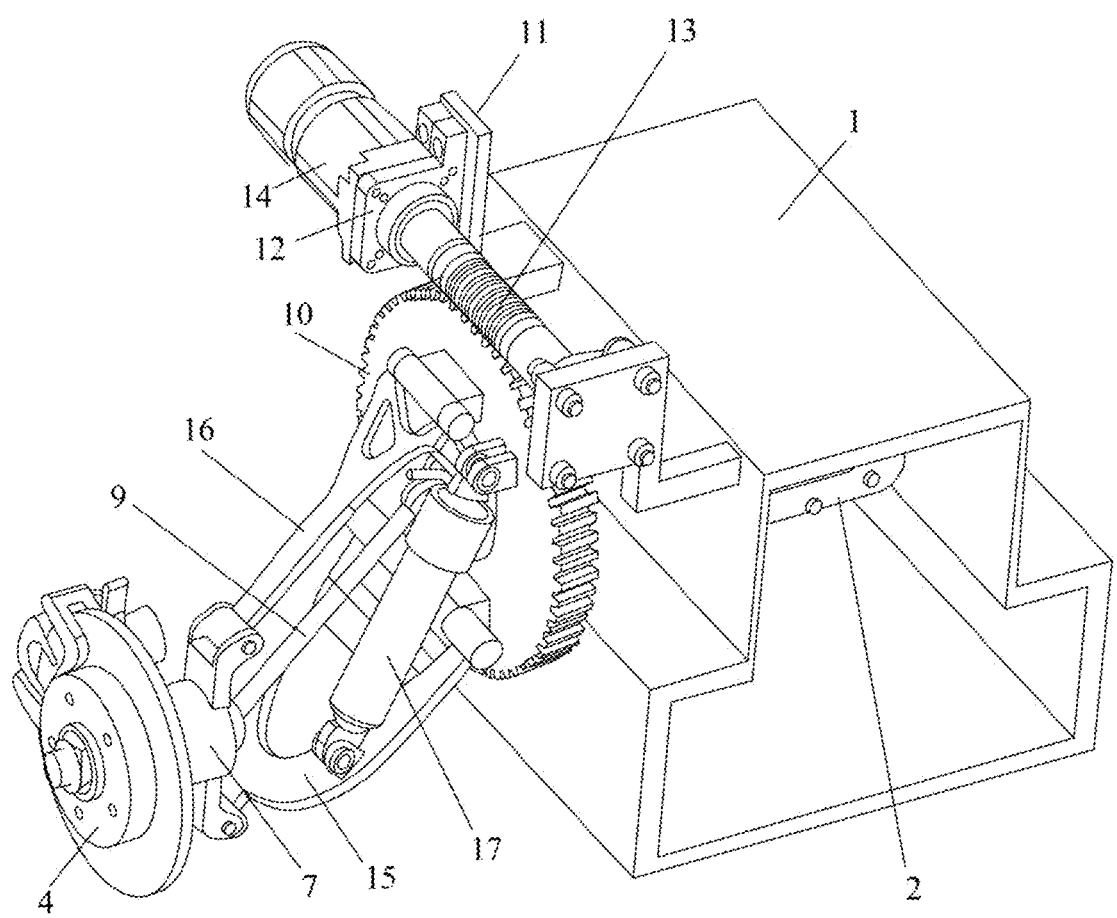
FIG. 2 is a structural schematic diagram that a suspension system on one side after vehicle wheels are dismantled is installed with a vehicle body frame according to an embodiment of the present disclosure.
Figure 3:
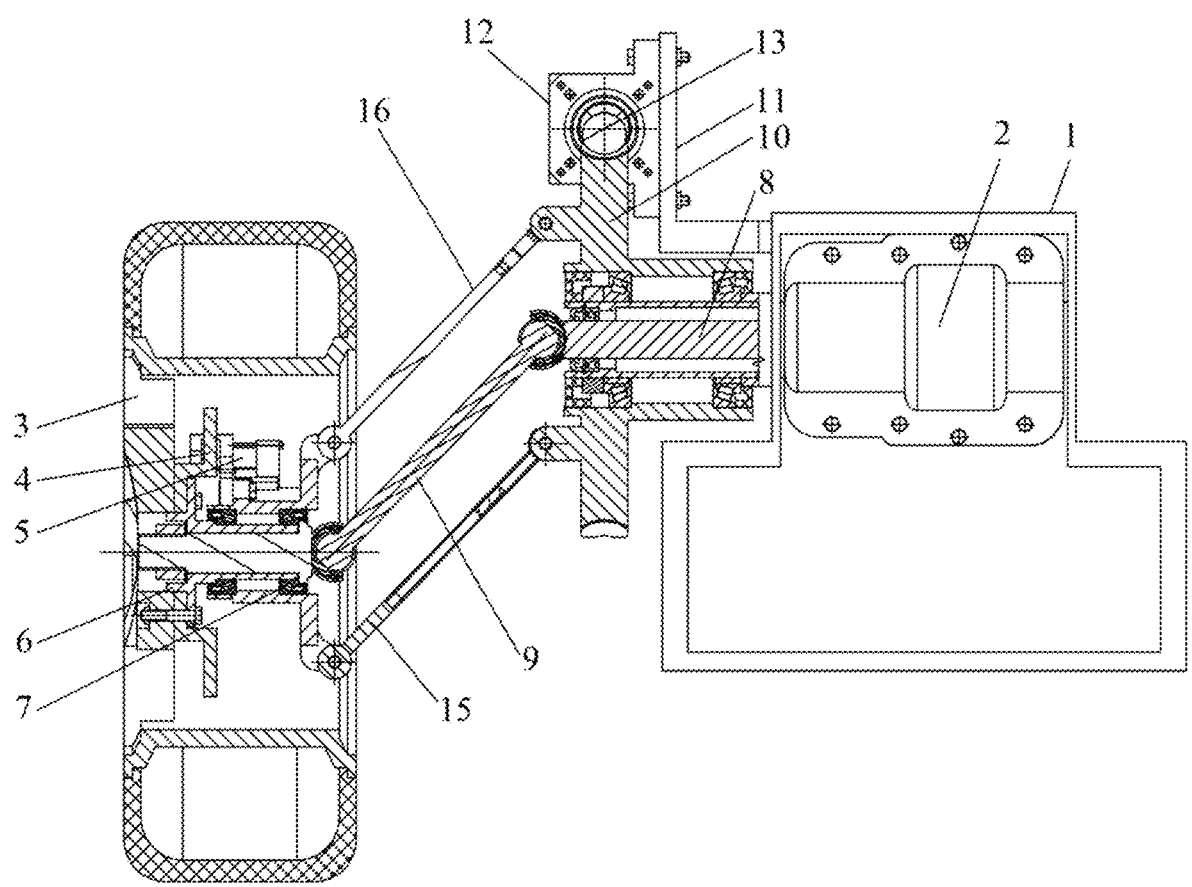
FIG. 3 is a cross-sectional schematic diagram when a suspension system is installed with a vehicle body frame and a vehicle wheel according to an embodiment of the present disclosure.

Referring to FIG. 1 to FIG. 3, a liftable rear suspension system of an amphibious vehicle includes a differential gear 2 and a brake disc 4. The differential gear 2 is installed inside a vehicle body frame 1, an output shaft 8 of the differential gear 2 stretches out of a side edge of the vehicle body frame 1. The brake disc 4 is installed on the inner side of a hub of a vehicle wheel 3. A brake 5 is arranged on an outer edge of the brake disc 4. In some embodiments, the brake 5 is a disc brake, which is quick in heat dissipation, low in weight, simple in structure and convenient to adjust, and is good in high temperature resistance and stable in braking effect during loading. A flange plate 6 is fixed on the inner side of the brake disc 4. Both the flange plate 6 and the brake disc 4 are locked on the hub of a vehicle wheel 3 through bolts and nuts. A universal joint arm 7 is rotatably installed on the periphery of one end, close to the vehicle body frame 1, of the flange plate 6 through a bearing. The flange plate 6 is connected to the output shaft 8 through a cage universal joint 9. The lifting height of more than 250 mm may be met since the deflection of the cage universal joint 9 is large enough. Generally, the cage universal joint 9 includes an inner sleeve, an outer sleeve, a cage and balls. Specifically, the midpoint of the outer sleeve, connected with the flange plate 6, of the cage universal joint 9 coincides with the central point at one end, close to the cage universal joint 9, of the flange plate 6, and further achieving the same rotation directions of the flange plate 6 and the output shaft 8, thus achieving a constant speed transmission. The included angle between both axes of the cage universal joint 9 is 46°.

A worm gear 10 is also rotatably installed on the periphery of one end, stretching out of the vehicle body frame 1, of the output shaft 8 through a bearing. A pair of bearing seats 12 are installed close to side edge on the vehicle body frame 1 through an installation rack 11. A worm 13 is rotatably connected between the pair of bearing seats 12, and the worm 13 is in meshed connection with the worm gear 10. A motor 14 for driving the worm 13 to rotate is also installed outside the bearing seat 12. Specifically, the model number of the motor 14 is ZD31-4.

A first double wishbone 15 and a second double wishbone 16 are respectively hinged between the universal joint arm 7 and the worm gear 10, and the first double wishbone 15 and the second double wishbone 16 are respectively located on both sides of the cage universal joint 9. In order to enable the liftable height of the chassis to be more than 250 mm, the arm lengths of the first double wishbone 15 and the second double wishbone 16 are each set to be 360 mm, and the thicknesses of the first double wishbone 15 and the second double wishbone 17 are each set to be 15 mm, so that the rigidity of the first double wishbone 15 and the second double wishbone 17 is ensured. A shock absorber 17 is also hinged between a surface of the first double wishbone 15 and the worm gear 10. Specifically, the shock absorber 17 is a bidirectional cylindrical shock absorber, and is good in shock absorption effect.

The working principle of the liftable rear suspension system of an amphibious vehicle is as follows. When the vehicle travels on land, power is provided by starting the motor 14. The motor 14 drives the worm 13 to rotate. The worm 13 drives the worm gear 10 to rotate. The worm gear 10 drives the universal joint arm 7 to rotate through the first double wishbone 15 and the second double wishbone 16, so that when the first double wishbone 15 rotates to the lowest position, the second double wishbone 16 rotates to the highest position, in this case, enabling elevating the chassis of the vehicle to the maximum height, and improving the passing performance. On the contrary, when the vehicle travels under water, the universal joint arm 7 rotates so that the first double wishbone 15 rotates to the highest position and the second double wishbone 16 rotates to the lowest position, in this case, enabling lowering the chassis of the vehicle to the minimum height, conductive to reducing the resistance of the vehicle navigation under water.

For those skilled in the art, apparently the present disclosure is not limited to the above-mentioned details of the exemplary embodiment, and the present disclosure can be achieved in other specific forms without departing from the spirit or essential characteristics of the present disclosure. Therefore, for every point, the embodiments should be regarded as exemplary embodiments and are unrestricted. The protection scope of the present disclosure is restricted by the attached claims rather than the above specification. Therefore, all variations fall within the meanings and scopes of equivalent elements of the claims are included in the present disclosure. Any reference signs in the claims should not be regarded as a limitation to the involved claims.

In addition, it should be understood that although the present specification is described with reference to implementations of the present disclosure, not each implementation contains only one entire technical solution. Such description of specification is just for clarity. Those skilled in the art should regard the specification as an entirety, and technical solutions of various embodiments can be combined appropriately to form other implementations which can be understood by those skilled in the art.

What is claimed is:

1. A liftable rear suspension system of an amphibious vehicle, comprising a differential gear (2) and a brake disc (4), the differential gear (2) being installed inside a vehicle body frame (1), and the brake disc (4) being installed on an inner side of a hub of a vehicle wheel (3), wherein a brake (5) is arranged on an outer edge of the brake disc (4), a flange plate (6) is fixed on an inner side of the brake disc (4), a universal joint arm (7) is rotatably installed on a periphery of one end, close to the vehicle body frame (1), of the flange plate (6) through a bearing, the flange plate (6) is connected to an output shaft (8) of the differential gear (2) through a cage universal joint (9), a worm gear (10) is rotatably installed on a periphery of one end, stretching out of the vehicle body frame (1), of the output shaft (8) through a bearing, a pair of bearing seats (12) are installed on the vehicle body frame (1) through an installation rack (11), a worm (13) is rotatably connected between the pair of bearing seats (12), the worm (13) is in meshed connection with the worm gear (10), a motor (14) for driving the worm (13) to rotate is installed outside the bearing seat (12); a first double wishbone (15) and a second double wishbone (16) are respectively hinged between the universal joint arm (7) and the worm gear (10), and a shock absorber (17) is hinged between a surface of the first double wishbone (15) and the worm gear (10).

2. The liftable rear suspension system of an amphibious vehicle according to claim 1, wherein a connection point of the cage universal joint (9) with the flange plate (6) coincides with a central point at one end, close to the cage universal joint (9), of the flange plate (6).

3. The liftable rear suspension system of an amphibious vehicle according to claim 1, wherein an included angle between two axes of the cage universal joint (9) is 46°.

4. The liftable rear suspension system of an amphibious vehicle according to claim 1, wherein the first double wishbone (15) and the second double wishbone (16) are each 360 mm in arm length and 15 mm in thickness.

5. The liftable rear suspension system of an amphibious vehicle according to claim 1, wherein the first double wishbone (15) and the second double wishbone (16) are located on two sides of the cage universal joint (9) respectively.

6. The liftable rear suspension system of an amphibious vehicle according to claim 1, wherein the shock absorber (17) is a bidirectional cylindrical shock absorber.

7. The liftable rear suspension system of an amphibious vehicle according to claim 1, wherein the motor is a ZD31-4.

* * * * *